United States Patent
Furuya

(10) Patent No.: US 6,196,087 B1
(45) Date of Patent: Mar. 6, 2001

(54) APPARATUS AND METHOD FOR REMOVING AN INSULATION COVER FROM AN INSULATION COVERED WIRE AT INTERMEDIATE PORTION

(75) Inventor: Hiroshi Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/401,122

(22) Filed: Sep. 22, 1999

(30) Foreign Application Priority Data

Sep. 22, 1998 (JP) .................................................. 10-267164

(51) Int. Cl.$^7$ ........................................................ H02G 1/12
(52) U.S. Cl. .................................................. 81/9.51; 81/9.4
(58) Field of Search ........................................ 81/9.4, 9.51

(56) References Cited

U.S. PATENT DOCUMENTS 3,909,911 * 10/1975 Smith et al. ............................. 29/427
5,781,990 * 7/1998 Seidler et al. .......................... 29/825

* cited by examiner

Primary Examiner—David A. Scherbel
Assistant Examiner—David B. Thomas
(74) Attorney, Agent, or Firm—Sughrue, Mion, Zinn, Macpeak & Seas, PLLC

(57) ABSTRACT

An apparatus for stripping a section 54 of insulation covering from an insulation-covered wire at a predetermined location along an insulation-covered wire 50. The apparatus includes a circumferential cutting portion 10 for circumferentially cutting the predetermined insulation-covering section 54 at both ends thereof, a slitting portion 20 for slitting the predetermined insulation-covering section 54 in the axial direction, and a stripping portion 36 for stripping the predetermined insulation-covering section 54 from the core 52 of the wire 50. The slitting portion 20 includes a twin-blade cutter device 23 located in parallel with a longitudinal direction of the insulation-covered wire, and an ultrasonic vibration horn portion 27 located above the twin-blade cutter device 23. An insulation-covered wire 50 is placed between the ultrasonic vibration horn portion 27 and the twin-blade cutter device 23, and is vibrated at the frequency of an ultrasonic wave generated by the ultrasonic vibration horn portion 27. A distance "d" between two blades of the twin-blade cutter device 23 is longer than the width of the core 52 of the insulation-covered wire 50.

7 Claims, 4 Drawing Sheets

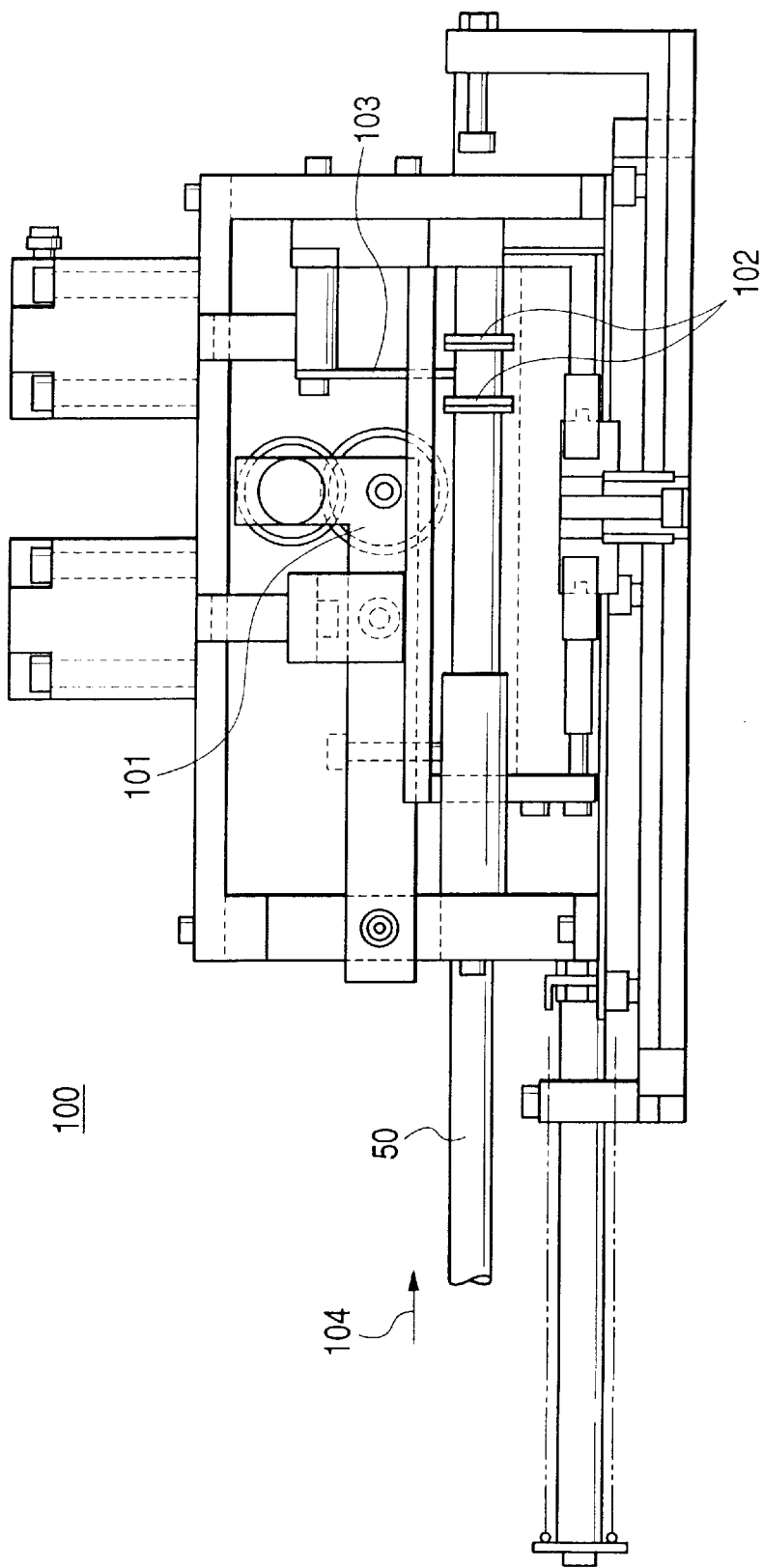

APPARATUS AND METHOD FOR REMOVING AN INSULATION COVER FROM AN INSULATION COVERED WIRE AT INTERMEDIATE PORTION

BACKGROUND OF INVENTION

1. Field of the Invention

The present invention relates to an apparatus and method for stripping a section of insulation covering from an insulation-covered wire at a predetermined location along the wire.

2. Related Art

FIG. 4 is a front view showing a conventional apparatus for stripping a section of insulation covering from an insulation-covered wire at a predetermined location along the wire (this apparatus will be referred to as an insulation-covering section stripping apparatus). In the conventional insulation-covering section stripping apparatus 100, an insulation-covered wire 50 is fed in a direction 104 of an arrow, and a slitting blade 101 is lowered onto the insulation-covered wire 50 to form a cut of a predetermined length in the insulation-covered wire 50 in the axial direction of the wire. Subsequently, the insulation-covered wire 50 is fed to a location of a couple of circumferential cutting blades 102, which are positioned while being spaced from each other by a predetermined distance. The insulation-covered wire 50 is circumferentially cut at two positions by the circumferential cutting blades 102. An insulation removal blade 103 is lowered onto the insulation-covered wire 50 to remove a section of insulation covering from the insulation-covered wire 50. Each circumferential cutting blade 102 includes two V-shaped blades. The insulation removal blade 103 uses a U-shaped groove. To remove the insulation-covering section, the U-shaped groove of the insulation removal blade 103 is pressed against the insulation-covered wire 50 to strip the section of the insulation covering from the wire.

Another insulation-covering section stripping 5 apparatus is known (JP-A-3-79929, U.S. Pat. No. 3,748,932). In the apparatus, an insulation-covered wire is axially cut, and circumferentially cut at two positions with circumferential cutting blades spaced by a predetermined distance. Then, the circumferential cutting blades are moved toward each other along the wire axis to separate the insulation-covering section from the wire. An additional insulation-covering section stripping apparatus is known (JP-A-56-19319). The stripping apparatus cuts an insulation-covered wire along its axial line with a heat cutter, which is heated to a temperature higher than a heat-resistant temperature of the insulation-covered wire, and strips the cut portion of the insulation covering from the wire.

Problems of the insulation-covering section stripping apparatuses mentioned above will be described. Large pressure acts on the slitting blade in cutting the insulation-covered wire in the axial direction. Wearing of the slitting blade progresses at relatively high rate. This problem is found in all of those conventional stripping apparatuses. A measure taken for this is to heat the slitting blade to a temperature higher than a heat-resistant temperature of the insulation-covered wire. The heating of the slitting blade at such a high temperature promotes the blunting of the slitting blade. This results in frequent adjustment, maintenance and exchanging of the slitting blade, and hence inefficient stripping work. An additional problem of the conventional art is that it is difficult to axially cut a thin insulation-covered wire, and to strip a section of insulation from the insulation-covered wire at a location intermediate the ends of the wire.

SUMMARY OF THE INVENTION

An object of the invention is to provide an insulation-covering section stripping apparatus which is able to elongate a lifetime of a slitting blade device for slitting an insulation-covered wire in the axial direction, and able to easily strip an insulation covering from the core of a thin insulation-covered wire.

In a broad aspect, the present invention provides a first apparatus for stripping a section of insulation covering from an insulation-covered wire at a predetermined location along the wire, the apparatus comprising: circumferential cutting member for circumferentially cutting the predetermined insulation-covering section at both ends thereof; slitting member for slitting the predetermined insulation-covering section in the axial direction; and stripping member for stripping the predetermined insulation-covering section from the core of the wire; wherein the slitting member includes an ultrasonic vibration generating device which applies an ultrasonic wave to the predetermined insulation-covering section to head and pressurize the predetermined insulation-covering section.

In the thus constructed insulation-covering section stripping apparatus, an insulation-covered wire is circumferentially cut at predetermined positions along the wire axis by use of the circumferential cutting member. Then, a section of insulation covering defined by the circumferential cutting is vibrated at a frequency of an ultrasonic wave generated by the ultrasonic vibration generating device of said slitting member, so that it is heated to be softened. In this state, the slitting member is pressed against the insulation-covering section. Thus, the insulation-covering section is softened, and therefore a decreased force is used for the slitting member to cut the insulation-covering section in the axial direction. The result is less wearing of the slitting member and elimination of the blunting of the slitting blade. The thus formed insulation-covering section is demarcated by the circumferential cutting and the longitudinal cutting. Therefore, separation of the insulation-covering section by the stripping member is easy.

A second insulation-covering section stripping apparatus corresponds to the first insulation-covering section stripping apparatus, which is modified such that the slitting member includes the ultrasonic vibration generating device disposed on one side of the insulation-covered wire and blade member disposed on the other side of the insulation-covered wire, the blade member being used for axially cutting the predetermined insulation-covering section.

The slitting member easily nips the insulation-covered wire between the ultrasonic vibration generating device disposed on one side of the insulation-covered wire and blade member disposed on the other side of the insulation-covered wire, and can slit the insulation-covered wire in an easy manner.

A third insulation-covering section stripping apparatus corresponds to the second insulation-covering section stripping apparatus modified such that the blade member includes two blades arranged parallel to the longitudinal direction of said insulation-covered wire. Since the blade member includes two parallel blades, two parallel cut lines with uniform depth can be formed in the insulation-covered wire. In this case, the core of the insulation-covered wire is little damaged and deformed.

The Insulation-covering section stripping apparatus of the present invention, wherein a distance between the two blades is larger than the width of the core of the wire. When the insulation-covered wire is axially cut in a state that the center between the two blades of the blade member is aligned with the axial line of the insulation-covered wire, there is a case that the wire is cut deep to reach the metallic core of the wire. In this case, the blades are positioned off the core. Accordingly, there is no chance that the core of the wire is damaged with the blades.

In another broad aspect, the present invention provides a method for stripping a predetermined section of insulation covering from an insulation-covered wire at a given location along the wire, said apparatus comprising the steps of: circumferentially cutting said predetermined insulation-covering section at both ends thereof; slitting said predetermined insulation-covering section in the axial direction in a manner that said predetermined insulation-covering section is heated and pressurized by applying ultrasonic wave vibration to said predetermined insulation-covering section; and stripping said predetermined insulation-covering section from the core of the wire.

In this stripping apparatus, an insulation-covered wire is circumferentially cut at predetermined positions along the wire axis, and then, a section of insulation covering defined by the circumferential cutting is vibrated by an ultrasonic wave applied thereto. In this state, pressure is applied to the insulation-covering section.

Therefore, the insulation-covered wire is heated and softened, and hence a decreased force is used for the slitting member to cut the insulation-covering section in the axial direction. The result is less wearing of the slitting member and elimination of the blunting of the slitting blade. As a result, separation of the insulation-covering section by the stripping member is easy.

The slitting step of the insulation-covering section stripping method may be carried out such that the predetermined insulation-covering section is slit along two axial lines being spaced from each other a distance longer than the width of the core of the wire. Thus, the predetermined insulation-covering section is slit along two axial lines being spaced from each other a distance longer than the width of the core of the wire. Therefore, even when the wire is cut deep to reach the metallic core of the wire, the blades are positioned off the core. Accordingly, there is no chance that the core of the wire is damaged with the blades.

BRIEF DESCRIPTION OF DRAWINGS

FIG. 1 shows an insulation-covering section stripping apparatus constructed according to the present invention;

FIG. 2 shows an operation of the embodiment of the invention.

FIG. 3 shows an overall insulation-covering section stripping apparatus constructed according to the present invention;

FIG. 4 is a front view showing a conventional insulation-covering section stripping apparatus.

DETAILED DESCRIPTION OF PREFERRED EMBODIMENTS

Figure 1A:
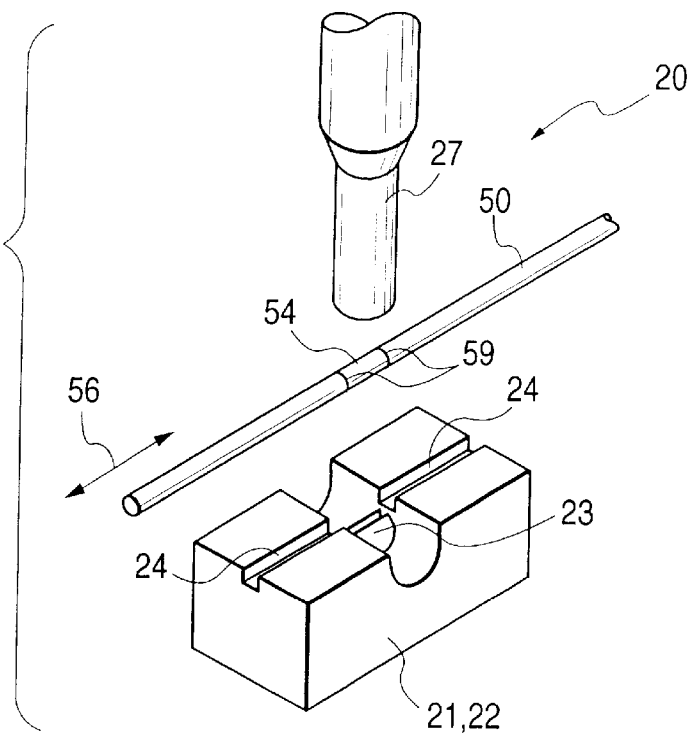
FIG. 1A is a perspective view showing a slitting portion for slitting an insulation-covering section in the axial direction.

An apparatus and method for stripping a section of insulation covering from an insulation-covered wire at a predetermined location along the wire, which are based on the present invention, will be described with reference to the accompanying drawings. In FIGS. 1 to 3, like reference numerals are used for designating like or equivalent portions.

Figure 3A:
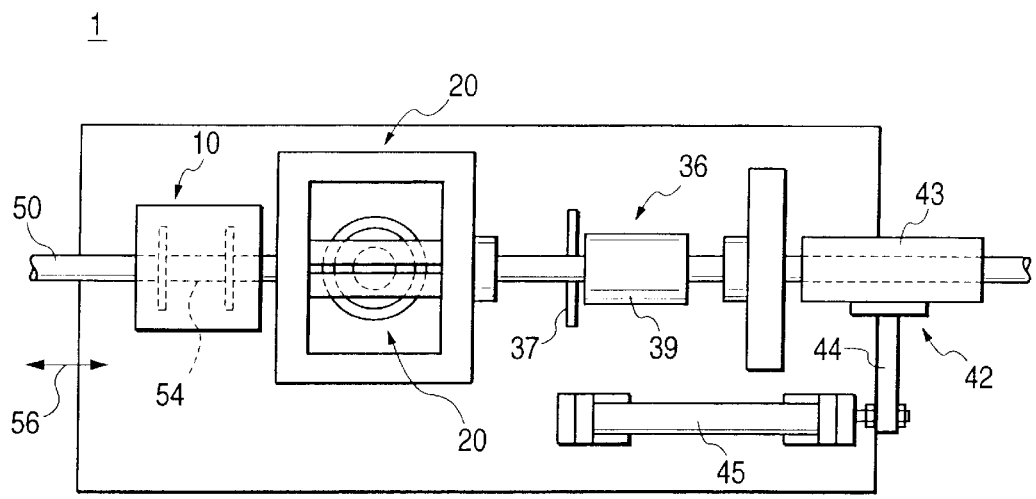
FIGS. 3A and 3B are plan and front views showing the insulation-covering section stripping apparatus.
Figure 3B:
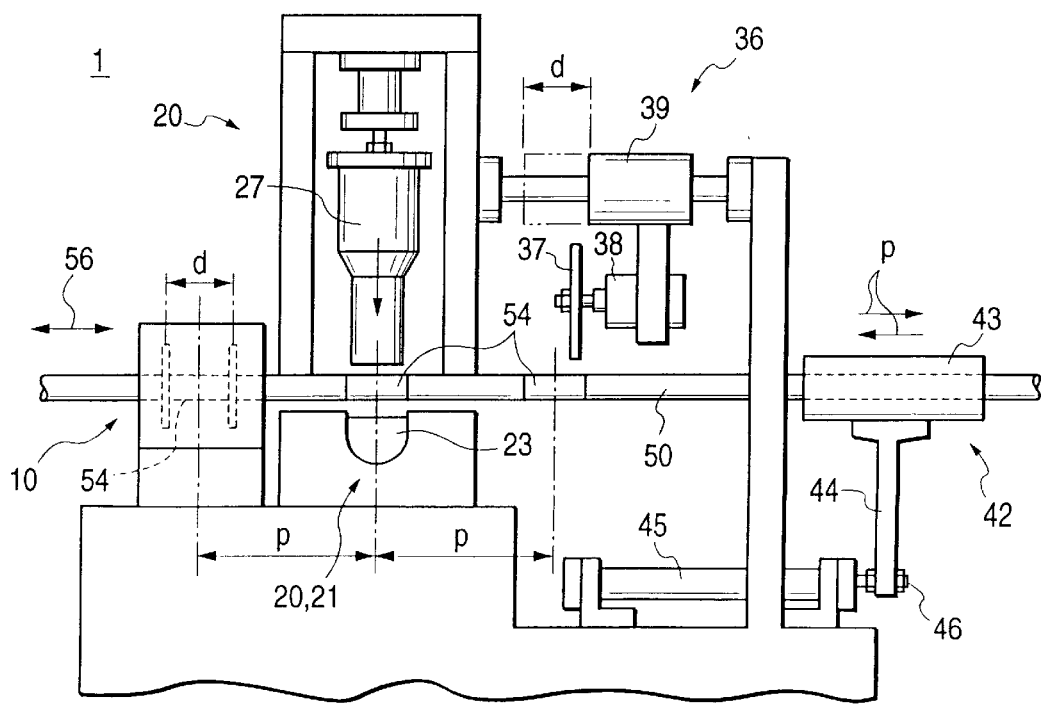

FIG. 3 shows an overall insulation-covering section stripping apparatus constructed according to the present invention; FIGS. 3A and 3B are plan and front views showing the insulation-covering section stripping apparatus. The insulation-covering section stripping apparatus 1 strips a section 54 of insulation covering from an insulation-covered wire 50 at a predetermined location along the wire or when viewed in the longitudinal or axial directions 56. The insulation-covering section stripping apparatus 1 includes a circumferential cutting portion 10 as circumferential cutting member for circumferentially cutting said predetermined insulation-covering section 54 at both ends of the insulation-covering section 54, a slitting portion 20 as slitting member for slitting said predetermined insulation-covering section 54 in the axial direction; a stripping portion 36 as stripping member for stripping said predetermined insulation-covering section 54 from the core of the wire; and wire feeding member 42 for moving the insulation-covered wire at pitches "p".

In FIG. 3, a plurality of predetermined insulation-covering sections 54 are illustrated. Actually, a single predetermined insulation-covering section 54 is formed at a predetermined location on the insulation-covered wire 50, and it is moved with the feeding of the insulation-covered wire 50 at pitches "p". FIG. 3 illustrates of this moving state. It is noted here that a plurality of predetermined insulation-covering sections 54 may be formed at predetermined locations on the insulation-covered wire 50, if necessary.

The circumferential cutting portion 10 includes a couple of blade sets each consisting of two V-shaped blades. The circumferential cutting portion 10 circumferentially cuts the predetermined insulation-covering section 54 at each end thereof, i.e., at two positions spaced from each other a distance "d" along the wire.

The stripping portion 36 includes a blade 37, which is driven by a motor 38. To remove the insulation-covering section from the wire, or the core of the wire, the blade 37 is pressed against the insulation-covered wire. The blade 37 and the motor 38 are moved a distance "d" along the wire by a driver 39, to strip the predetermined insulation-covering section 54 from the wire.

The wire feeding member 42 reciprocally moves the insulation-covered wire 50 at predetermined pitches "p" in the wire feeding direction in a state that the wire is chucked with a chuck 43. A combination of a cylinder 45 and a piston 46, which is coupled to one end of an arm 44, is used for effecting the reciprocal motion of the chuck 43.

Figure 1B:
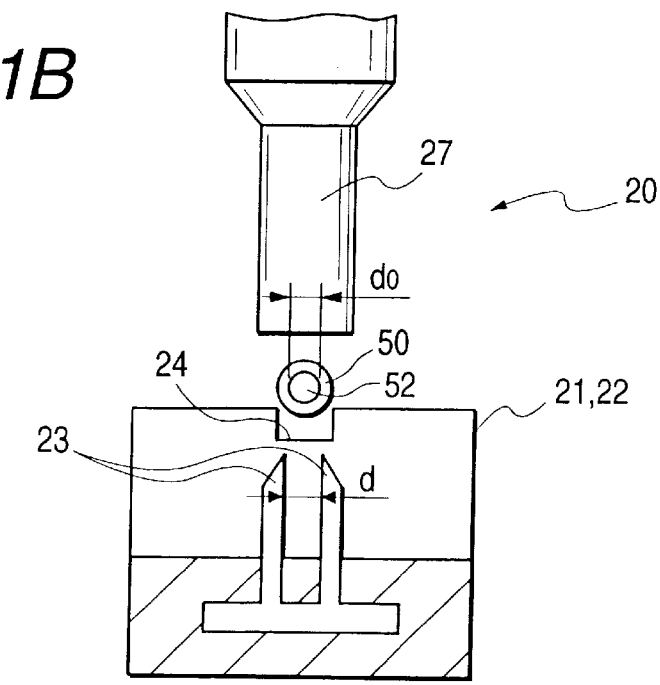
FIG. 1B is a side view showing the slitting portion of FIG. 1A.

FIG. 1 shows an insulation-covering section stripping apparatus constructed according to the present invention;

FIG. 1A is a perspective view showing a slitting portion for slitting an insulation-covering section in the axial direction, and FIG. 1B is a side view showing the slitting portion of FIG. 1A. The slitting portion 20 includes an ultrasonic vibration horn portion 27 and a twin-blade cutter device 23. The ultrasonic vibration horn portion 27 is located on one side (the upper side in the figure) of the insulation-covered wire with the longitudinal direction 56. The twin-blade cutter device 23 is located on the other side (the lower side in the figure) of the insulation-covered wire 50. The ultrasonic vibration horn portion 27 functions as an ultrasonic vibration generating device which vibrates the predetermined insulation-covering section 54 at a frequency of an ultrasonic wave generated thereby, whereby the predetermined insulation-covering section 54 is heated and pressed. The twin-blade cutter device 23 cuts the predetermined insulation-covering section 54 along axial lines.

A blade portion 21 includes the twin-blade cutter device 23 and an anvil 22. The twin-blade cutter device 23 cuts the insulation-covered wire in the longitudinal direction 56 (to form slits therein). The anvil 22 holds the insulation-covered wire 50 with a groove 24. The twin-blade cutter device 23 has two blades parallel to each other and to the wire axial direction. Those blades are spaced from each other a distance "d". The distance is equal to or larger than the width of the core of the insulation-covered wire 50 in order to avoid damage of the wire core by the blades. The wire core is circular in cross section, and its diameter is equal to or larger than a diameter "do".

FIG. 2 shows an operation of the embodiment of the invention. FIG. 2A is a front view showing an insulation-covered wire circumferentially cut an insulation-covering section of an insulation-covered wire at both ends thereof; FIG. 2B is a front view showing a state that the circumferentially cut insulation-covering section of the insulation-covered wire is subjected to ultrasonic vibration for its heating; FIG. 2C is a front view showing a state that the insulation-covering section is longitudinally cut while being under pressure; and FIG. 2D is a front view showing the insulation-covered wire after the insulation-covering section is removed and the core of the insulation-covered wire is exposed As shown in FIG. 2A, the insulation-covered wire 50 is cut at two positions, viz., both ends of the predetermined insulation-covering section 54 of the wire 50. The formed cuts are designated by reference numeral 59. As shown in FIG. 2B, the wire portions 50a and 50b extended from both sides of the predetermined insulation-covering section 54 are placed in the groove 24 (FIG. 1) of the anvil 22. In this case, the insulation-covered wire is adjusted so that its predetermined insulation-covering section 54 is located just above the twin-blade cutter device 23.

In this state, the ultrasonic vibration born portion 27 is lowered in a direction 28 of an arrow, and operated to emit an ultrasonic wave toward the predetermined insulation-covering section 54, and the section 54 is placed between the extreme end 29 of the ultrasonic vibration horn portion 27 and the twin-blade cutter device 23, and compressed. The insulation covering 51 is vibrated to be softened, and the twin-blade cutter device 23 easily cuts into the insulation covering 51 to form slits in the same in the longitudinal direction of the wire. After the slit forming, the stripping portion 36 (not shown in FIG. 2) strips the insulation-covering section from the wire, so that the core 52 of the insulation-covered wire 50 is exposed as shown in FIG. 2.

The thus constructed insulation-covering section stripping apparatus 1 is capable of efficiently stripping an insulation-covering section from a insulation-covered wire at a predetermined location along the wire. The stripping apparatus is applicable to the stripping of the insulation-covering sections from insulation-covered wires of multiple kinds and various wires sizes.

Figure 2A:
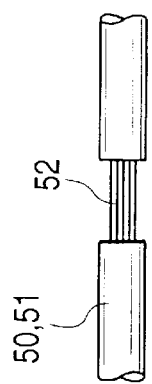
FIG. 2A is a front view showing an insulation-covered wire circumferentially cut an insulation-covering section of an insulation-covered wire at both ends thereof.
Figure 2B:
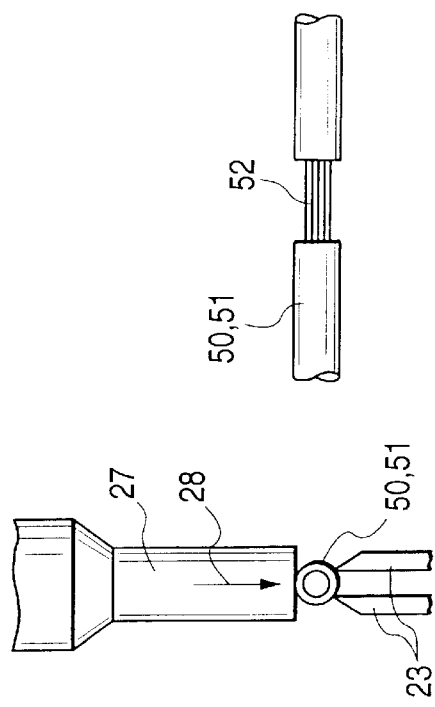
FIG. 2B is a front view showing a state that the circumferentially cut insulation-covering section of the insulation-covered wire is subjected to ultrasonic vibration for its heating.
Figure 2C:
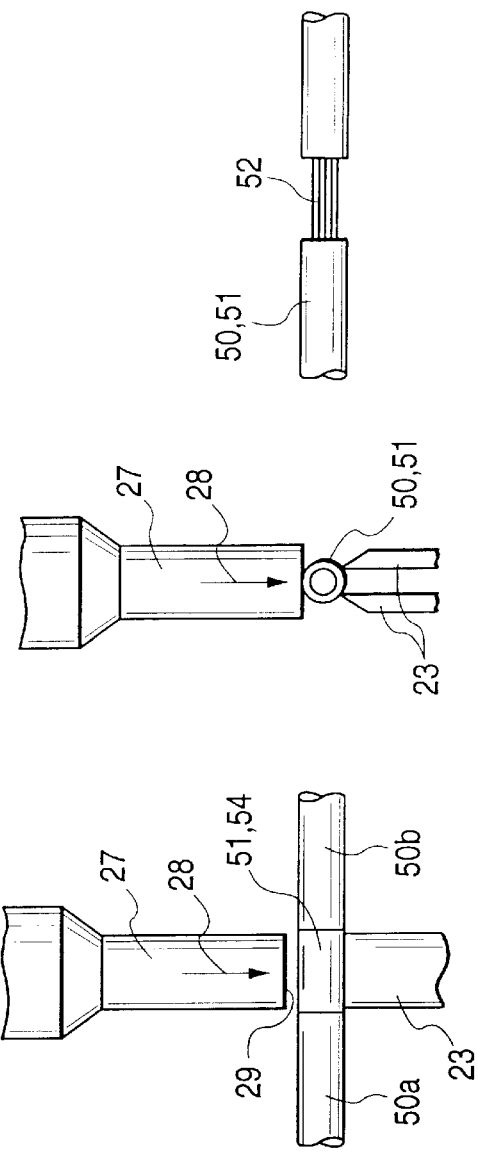
FIG. 2C is a front view showing a state that the insulation-covering section is longitudinally cut while being under pressure.
Figure 2D:
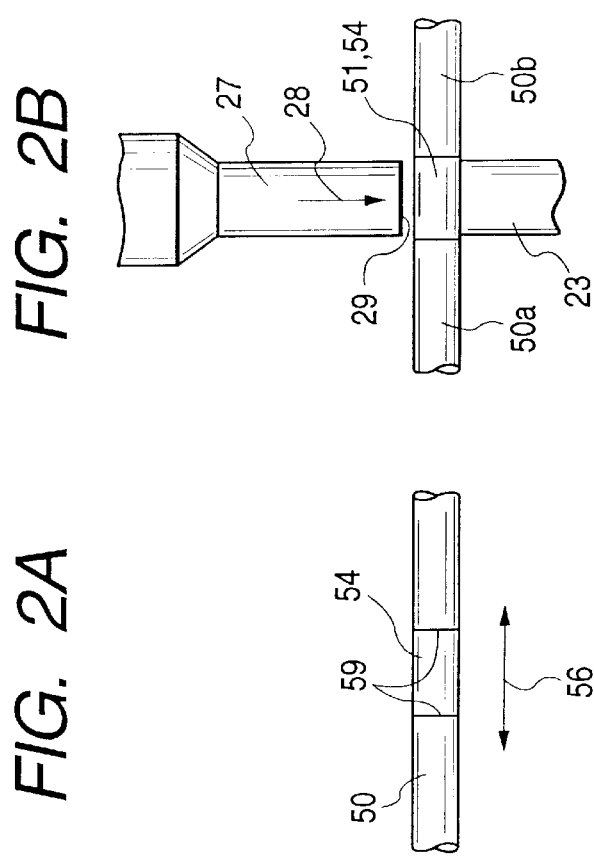
FIG. 2D is a front view showing the insulation-covered wire after the insulation-covering section is removed and the core of the insulation-covered wire is exposed.

Description will be given about a method for stripping a predetermined section of insulation covering from an insulation-covered wire at a given location along the wire. Most of the description of the insulation-covering section stripping apparatus, which was made with reference to FIG. 2, is available for the description of the insulation-covering section stripping method. For a clarity, the method description will be described referring to FIG. 2 again. The insulation-covering section stripping method strips the predetermined insulation-covering section 54 from the insulation-covered wire 50. To start, the predetermined insulation-covering section 54 is cut at both ends thereof to form cuts 59 (FIG. 2A). The predetermined insulation-covering section 54 is then moved and vibrated by an ultrasonic wave to be heated, and compressed, whereby axial cuts are formed in the predetermined insulation-covering section 54 (FIGS. 2B and 2C). Finally, the predetermined insulation-covering section 54 is removed (FIG. 1D). The slits thus formed are spaced from each other a distance larger than the width of the core 52 of the insulation-covered wire.

In this method, the insulation-covered wire 50 is vibrated by an ultrasonic wave, and hence heated and softened. Therefore, a decreased force is used to cut the insulation-covering section in the axial direction. The result is less wearing of the slitting member and elimination of the blunting of the slitting blade. The softening of the insulation-covering section makes it easy to slit there. Accordingly, separation of the insulation-covering section by the stripping member is easy. Since the predetermined insulation-covering section is slit along two axial lines, even when the wire is cut deep to reach the metallic core of the wire, the blades are positioned off the core, and hence, there is no chance that the core of the wire is damaged with the blades.

The insulation-covering section stripping method has the following advantages:
a) Elongation of the twin-blade cutter device 23 is secured and a product quality is stabilized since the twin-blade cutter device 23 is applied to the softened insulation covering 51.
b) Only exchanging of the current anvil 22 with another is required for changing the kind of products to another. This leads to improvement of production efficiency.
c) The present invention is applicable to the stripping of an insulation-covering section from a thin insulation-covered wire. This implies improvement of the versatility in implementation of the invention.

As seen from the foregoing description, a method and apparatus for stripping an insulation-covering section from a insulation-covered wire yield the follow advantages: to elongate a lifetime of a slitting blade device for slitting an insulation-covered wire in the axial direction, and to stabilize the quality of the resultant products, and to easily strip an insulation covering from the core of a thin insulation-covered wire.

What is claimed is:

1. An apparatus for stripping a predetermined section of insulation covering from an insulation-covered wire at a predetermined location along the insulation-covered wire, said apparatus comprising:

a circumferential cutting member for circumferentially cutting said predetermined insulation-covering section at opposite ends of said predetermined insulation-covering section;

a slitting member for slitting said predetermined insulation-covering section in an axial direction of said insulation-covered wire; and a stripping member for stripping said predetermined insulation-covering section from a core of said insulation-covered wire;

wherein said slitting member comprises an ultrasonic vibration generating device which applies an ultrasonic wave to said predetermined insulation-covering section to heat and press said predetermined insulation-covering section.

2. The apparatus in accordance with claim 1, wherein said ultrasonic vibration generating device is disposed on a first side of said insulation-covered wires and said slitting member further comprises a blade member disposed on a second side of said insulation-covered wire, said blade member axially cutting said predetermined insulation-covering section.

3. The apparatus in accordance with claim 2, wherein said blade member includes two blades arranged parallel to the axial direction of said insulation-covered wire.

4. The apparatus in accordance with 3, wherein a distance between said two blades is larger than a width of the core of said insulation-covered wire.

5. A method for stripping a predetermined section of insulation covering from an insulation-covered wire at a predetermined location along the insulation-covered wire, said apparatus comprising the steps of:

circumferentially cutting said predetermined insulation-covering section at opposite ends of said predetermined insulation-covering section;

slitting said predetermined insulation-covering section in an axial direction of said insulation-covered wire by applying ultrasonic wave vibration to said predetermined insulation-covering section to heat and press said predetermined insulation-covering section; and stripping said predetermined insulation-covering section from a core of said insulation-covered wire.

6. The insulation-covering section stripping method in accordance with 5, wherein in said slitting step, said predetermined insulation-covering section is slit along two axial lines being spaced from each other by a distance which is larger than a width of the core of said insulation-covered wire.

7. The apparatus in accordance with claim 1, further comprising a wire feeding member for moving said insulation-covered wire at predetermined pitches to move said predetermined insulation-covering section between said circumferential cutting member, said slitting member and said stripping member.

* * * * *